United States Patent
Lin et al.

(10) Patent No.: US 8,838,177 B2
(45) Date of Patent: Sep. 16, 2014

(54) BASE STATION POWER SAVING METHOD AND SYSTEM

(75) Inventors: Shugong Lin, Shenzhen (CN); Junqiang Liu, Shenzhen (CN); Yunliang Geng, Shenzhen (CN); Donglei Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 237 days.

(21) Appl. No.: 13/498,971

(22) PCT Filed: Aug. 25, 2010

(86) PCT No.: PCT/CN2010/076338
§ 371 (c)(1),
(2), (4) Date: Mar. 29, 2012

(87) PCT Pub. No.: WO2011/082586
PCT Pub. Date: Jul. 14, 2011

(65) Prior Publication Data
US 2012/0178492 A1    Jul. 12, 2012

(30) Foreign Application Priority Data
Jan. 5, 2010   (CN) .......................... 2010 1 0001805

(51) Int. Cl.
*H04W 52/02* (2009.01)

(52) U.S. Cl.
CPC ............ *H04W 52/0206* (2013.01); *Y02B 60/50* (2013.01)
USPC .................................... 455/562.1; 455/127.5

(58) Field of Classification Search
CPC ........... H04B 7/02; H04B 7/024; H04W 4/00; H04W 52/0206
USPC ................ 455/67.11, 103, 104, 115.1, 127.1, 455/127.3, 127.5, 561, 562.1, 574
See application file for complete search history.

(56) References Cited

U.S. PATENT DOCUMENTS 6,584,330 B1 * 6/2003 Ruuska ......................... 455/574
6,662,024 B2 * 12/2003 Walton et al. .............. 455/562.1

(Continued)

FOREIGN PATENT DOCUMENTS

| CN | 101111013 A | 1/2008 |
|---|---|---|
| CN | 101299841 A | 11/2008 |

(Continued)

OTHER PUBLICATIONS

International Search Report for PCT/CN2010/076338, English translation attached to original, Both competed by the Chinese Patent Office on Nov. 5, 2010, 6 Pages.

*Primary Examiner* — Blane J Jackson
(74) *Attorney, Agent, or Firm* — Brooks Kushman P.C.

(57) ABSTRACT

A method and system are disclosed for power saving of NodeB. The method includes the following steps: when a first condition is met, the NodeB enters a power saving mode and at least one multi-input multi-output (MIMO) cell of the NodeB is reconfigured as a non-MIMO cell; when a second condition is met, the NodeB enters a normal mode, and at least one non-MIMO cell of the NodeB is reconfigured as a MIMO cell. The method and system can dynamically configure the cell mode, which both ensures the experience of MIMO terminal and saves the power consumption of the NodeB in the case that the user data amount is not large.

14 Claims, 2 Drawing Sheets

(56) References Cited

U.S. PATENT DOCUMENTS

| | | | |
|---|---|---|---|
| 7,184,743 B2 * | 2/2007 | Walton et al. | 455/343.4 |
| 7,191,381 B2 * | 3/2007 | Gesbert et al. | 714/759 |
| 8,081,698 B2 * | 12/2011 | Xu et al. | 375/267 |
| 8,140,122 B2 * | 3/2012 | Park et al. | 455/561 |
| 8,203,986 B2 * | 6/2012 | Aragon et al. | 370/311 |
| 8,259,848 B2 * | 9/2012 | Malladi | 375/298 |
| 8,565,827 B2 * | 10/2013 | Kim et al. | 455/562.1 |
| 8,605,637 B2 * | 12/2013 | Aragon et al. | 370/311 |
| 2010/0296591 A1 * | 11/2010 | Xu et al. | 375/259 |
| 2011/0075634 A1 | 3/2011 | Maruyama | |
| 2011/0081934 A1 * | 4/2011 | Imamura et al. | 455/522 |
| 2012/0015682 A1 * | 1/2012 | Scipione et al. | 455/522 |
| 2012/0149411 A1 * | 6/2012 | Miyoshi et al. | 455/501 |

FOREIGN PATENT DOCUMENTS

| | | |
|---|---|---|
| CN | 101778458 A | 7/2010 |
| JP | 2009044415 A | 2/2009 |
| WO | 2009147940 A1 | 12/2009 |

* cited by examiner

BASE STATION POWER SAVING METHOD AND SYSTEM

CROSS-REFERENCE TO RELATED APPLICATION

This application is the U.S. national phase of PCT Appln. No. PCT/CN2010/076338 filed Aug. 25, 2010 which claims priority to Chinese Application No. 201010001805.X filed Jan. 5, 2010, the disclosures of which are incorporated in their entirety by reference herein.

TECHNICAL FIELD

The present invention relates to a wireless communication system, and in particular, to a method and system for power saving of NodeB.

BACKGROUND OF THE RELATED ART

At present, the profit of the telecommunication industry is reducing progressively, and the telecommunication operators are realizing the income increase by expanding the market share and the service type, and at the same time they also pay more and more attention to saving the operation cost (OPEX), and the energy consumptions of the equipment is an important part of the OPEX.

The universal mobile telecommunications system (UMTS) can be divided into several main components: one or more core networks (CN) which is responsible for establishing and controlling the user session and the UMTS terrestrial radio access network (UTRAN) which controls the air interface access. The UTRAN includes two network elements: a radio network controller (RNC) and a NodeB, wherein the NodeB further includes the baseband processing unit (BBU) and a radio frequency processing unit (RU). The architecture of the UTRAN is shown in FIG. 1. The main functions of the BBU include the baseband processing function finishing the Uu interface (channel coding, multiplexing, modulating and spread spectrum and so on, which are suitable for air transmission), the Iub interface function with the radio network controller (RNC), signaling processing, local and remote operation maintenance function, and the function for monitoring the working state of the NodeB system and reporting alarm information. The main function of the RU includes several following modules:

an intermediate frequency module: configured to finish the function of modulating-demodulating, upper and lower digital frequency conversion, A/D conversion of the optical transmission;

a transceiver module: configured to finish the conversion function from the intermediate frequency signal to the radio frequency signal;

a power amplifier: configured to finish the enhancement function of the signal;

a filtering module: configured to finish the filtering function of the signal.

It can be seen from FIG. 1 that one RNC generally includes a plurality of NodeBs, and one NodeB generally includes one baseband processing unit (BBU) and a plurality of radio frequency processing units (RU). Therefore, if the power consumption of the radio frequency processing unit is saved, the power consumption of the whole UTRAN will be saved greatly.

The high speed downlink packet access (HSDPA) is a kind of technology put forward in Release-5 of the 3rd generation partnership project (3GPP), which is used for improving the network data throughput in the downlink direction (from the network to the terminal), and the peak value of downlink speed of the cell and individual user that are designed by HSDPA can reach to 14.4 Mbps. Subsequently, in order to make the peak value of downlink speed higher, the new HSPA+ technologies are introduced. These technologies includes the DL 64QAM high-order modulation and multi-input multi-output (MIMO) antenna technology put forward in Release-7, and the multi-carrier (DC) HSDPA technology put forward in Release-8, and the DC HSDPA+MIMO technology put forward in Release-9.

The MIMO utilizes a plurality of antennas to inhibit the channel from declining, which can improve the wireless channel capacity and the spectral utilization rate in the case that the bandwidth is not added. After the MIMO is introduced, the peak value of the speed of the cell and individual user is 28.8 Mbps in the case of MIMO+16QAM, and it can reach to 43.2 Mbps in the case of MIMO+64 QAM. However, in order to support the MIMO technology, the transmitting end needs to modulate data to two irrelevant antennas and send the data at the same time, and the receiving party also needs to receive the data from two irrelevant antennas at the same time and performs demodulation. The technological principle diagram of the MIMO provided by the 3GPP TS 25.214 is shown in FIG. 2.

There are two pilot configuration modes of the MIMO on two antennas:

one antenna sends the P-CPICH channel in the modulation mode of Antenna1, and the other antenna transmits the P-CPICH channel in the modulation mode of Antenna2, that is, the master pilot—master pilot mode;

two antennas send the P-CPICH and the S-CPICH channels respectively in the modulation mode of Antenna1, that is, the master pilot—slave pilot mode.

It can be seen from FIG. 2 that the MIMO requires two sets of radio frequency processing units (RU), and each set processes the data on an antenna respectively. In the case of the same coverage, the MIMO cell in the master pilot—master pilot mode is configured, and the transmission power of the common channel configured by each corresponding RU is half of that of the non-MIMO cell, therefore, the total transmission power of the common channel of the two RUs is same with that of the non-MIMO cell; for the MIMO cell configured in the master pilot—slave pilot mode, the transmission power configured by the master pilot is same with that of the non-MIMO, and the transmission power of the slave pilot can be configured according to the actual condition, and the transmission power of other common channels in each RU are half of that of the non-MIMO cell, therefore the total transmission power of the common channel of two RUs has an additional power configured by the slave pilot than that of the non-MIMO cell.

Meanwhile, since the power consumption of RU is related to the transmission power and its power amplification efficiency. In the case of the same transmission power, the lower the power amplification efficiency is, the greater the power consumption is. The power amplification efficiency of the RU is related to its output power, and for the same RU, the higher the output power is, the higher the power amplification efficiency is. Therefore, in the MIMO cell in the master pilot—master pilot mode, the total transmission power is same with that of the non-MIMO cell, however, the RU transmission power of each MIMO cell is only half of that of the RU of the non-MIMO cell, thus its power amplification efficiency is not higher than that of the RU of the non-MIMO cell, which leads that its total power consumption is higher than that of the non-MIMO cell. And for the non-MIMO cell in the master pilot—slave pilot mode, its total transmission power is higher than that of the non-MIMO, therefore its total power consumption is obviously higher than that of the non-MIMO cell.

At present, in the UMTS system, the cell is either configured fixedly in the MIMO mode or configured fixedly in the non-MIMO mode. The advantage of the cell configured in the MIMO mode is to improve the throughput rate of the user data, however, whether the terminal user in the MIMO cell can adopt the MIMO dual stream mode for scheduling is related to the terminal ability, the data amount of the terminal user and the CQI of the terminal user. If the cell still adopts the MIMO mode to transmit in the case that the terminal user does not meet the MIMO dual stream mode, the RU power consumption is wasted. The RU power consumption of the cell configured in the non-MIMO mode is a bit smaller than that of the MIMO cell; however, the MIMO terminal user is unable to experience the high speed data throughput rate of the MIMO.

SUMMARY OF THE INVENTION

The technical problem to be solved by the present invention is to provide a method and system for power saving of NodeB, which both satisfies the experience of MIMO user and reduces the power consumption of NodeB appropriately.

In order to solve the above problem, the present invention provides a method for power saving of NodeB, comprising:

when a first condition is met, the NodeB entering a power saving mode, and at least one multi-input multi-output (MIMO) cell of the NodeB being reconfigured as a non-MIMO cell;

when a second condition is met, the NodeB entering a normal mode, and at least one non-MIMO cell of the NodeB being reconfigured as a MIMO cell.

The first condition comprises: user data amount of the MIMO cell being less than a preset user data amount threshold of reconfiguring the MIMO cell to the non-MIMO cell in a continuous period of time, and/or a time point, which is preset by a system, of reconfiguring the MIMO cell to the non-MIMO cell.

The second condition comprises: the user data amount of the non-MIMO cell being greater than a preset user data amount threshold of recovering the non-MIMO cell to the MIMO cell in a continuous period of time, and/or a time point, which is preset by the system, of recovering the non-MIMO cell to the MIMO cell.

The step of at least one MIMO cell of the NodeB being reconfigured as a non-MIMO cell comprises:

a NodeB controller sending a reconfiguration message with a connection frame number (CFN) to the NodeB, and requesting the NodeB to reconfigure the MIMO cell to the non-MIMO cell;

after the NodeB receives the reconfiguration message, reconfiguring a designated cell as the non-MIMO cell and closing one emitting antenna in a designated CFN.

The method further comprises: before the MIMO cell is reconfigured to the non-MIMO cell, the NodeB controller notifying user equipment (UE) that the MIMO cell will be reconfigured as the non-MIMO cell in the CFN through a system information block (SIB) message with the CFN, a reconfiguration message with the CFN or a customized message with the CFN.

The step of at least one non-MIMO cell of the NodeB being reconfigured as a MIMO cell comprises:

the NodeB controller sending the reconfiguration message with the CFN to the NodeB, and requesting the NodeB to reconfigure the non-MIMO cell as the MIMO cell;

after the NodeB receives the reconfiguration message, reconfiguring the designated cell as the MIMO cell and opening one closed emitting antenna in the designated CFN.

The method further comprises: before the non-MIMO cell is reconfigured to the MIMO cell, the NodeB controller notifying the UE that the non-MIMO cell will be reconfigured as the MIMO cell in the CFN through a SIB message with the CFN or a reconfiguration message with the CFN or a customized message with the CFN.

The step of at least one MIMO cell of the NodeB being reconfigured as the non-MIMO cell comprises: the NodeB actively sending a message to the NodeB controller to instruct the NodeB controller to reconfigure the MIMO cell as the non-MIMO cell, or the NodeB controller actively reconfiguring the MIMO cell as the non-MIMO cell;

the step of at least one non-MIMO cell of the NodeB being reconfigured as the MIMO cell comprises: the NodeB actively sending a message to the NodeB controller to instruct the NodeB controller to reconfigure the non-MIMO cell as the MIMO cell, or the NodeB controller actively reconfiguring the non-MIMO cell as the MIMO cell.

A system for power saving of NodeB comprises:

a NodeB, configured to when a first condition is met, enter a power saving mode and reconfigure at least one multi-input multi-output (MIMO) cell of the NodeB as a non-MIMO cell; and when a second condition is met, enter a normal mode and reconfigure at least one non-MIMO cell of the NodeB as a MIMO cell.

The first condition comprises: user data amount of the MIMO cell being less than a preset user data amount threshold of reconfiguring the MIMO cell to the non-MIMO cell in a continuous period of time, and/or a time point, which is preset by a system, of reconfiguring the MIMO cell to the non-MIMO cell.

The second condition comprises: the user data amount of the non-MIMO cell being greater than a preset user data amount threshold of recovering the non-MIMO cell to the MIMO cell in a continuous period of time, and/or a time point, which is preset by the system, of recovering the non-MIMO cell to the MIMO cell.

The system further comprises a NodeB controller, configured to send a reconfiguration message with a connection frame number (CFN) to the NodeB, and request the NodeB to reconfigure the MIMO cell to the non-MIMO cell; and the NodeB is configured to reconfigure at least one MIMO cell of the NodeB as the non-MIMO cell in the following mode: after receiving the reconfiguration message, reconfiguring a designated cell as the non-MIMO cell and closing one emitting antenna in the designated CFN.

The NodeB controller is further configured to: before the MIMO cell is reconfigured to the non-MIMO cell, notify user equipment (UE) that the MIMO cell will be reconfigured as the non-MIMO cell in the CFN through a system information block (SIB) message with the CFN or a reconfiguration message with the CFN.

The system further comprises a NodeB controller, configured to send the reconfiguration message with the CFN to the NodeB, and instruct the NodeB to reconfigure the non-MIMO cell to the MIMO cell;

the NodeB is configured to reconfigure at least one non-MIMO cell of the NodeB as a MIMO cell in the following mode: after receiving the reconfiguration message, reconfiguring the designated cell as the MIMO cell and opening one closed emitting antenna in the designated CFN.

The NodeB controller is further configured to: before the non-MIMO cell is reconfigured to the MIMO cell, notify the UE that the non-MIMO cell will be reconfigured as the MIMO cell in the CFN through a SIB message with the CFN or a reconfiguration message with the CFN.

A system for power saving of a NodeB, comprising a NodeB controller, configured to:

when a first condition is met, receive an indication message sent by the NodeB and reconfigure a multi-input multi-output (MIMO) cell as a non-MIMO cell; and when a second condition is met, receive the indication message sent by the NodeB and reconfigure the non-MIMO cell as the MIMO cell; or when a first condition is met, actively reconfigure the MIMO cell as the non-MIMO cell; or when a second condition is met, actively reconfigure the non-MIMO cell as the MIMO cell.

The method and system for power saving of the NodeB provided by the present invention can dynamically configure the cell mode, which both ensures the experience of MIMO terminal and saves the power consumption of the NodeB in the case that the user data amount is not large.

PREFERRED EMBODIMENTS OF THE PRESENT INVENTION

Figure 1:
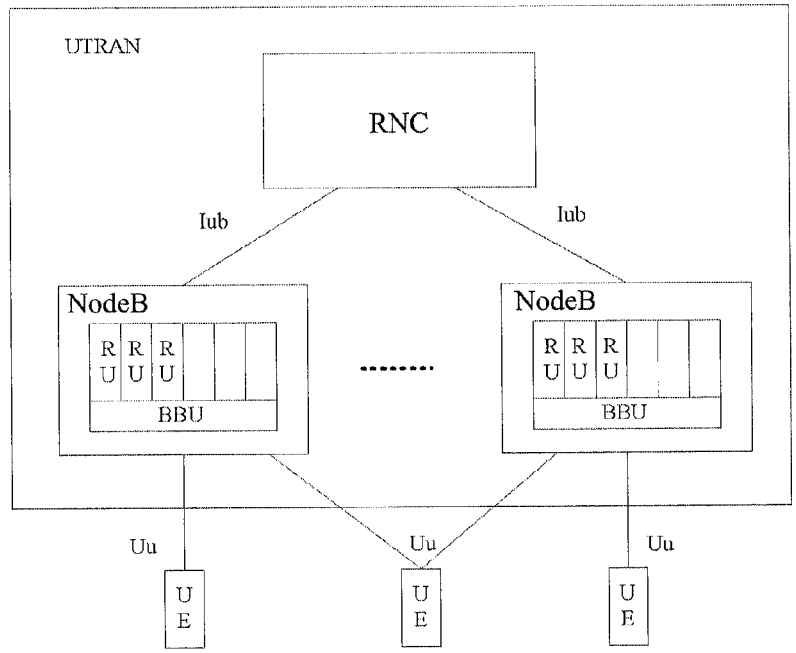
FIG. 1 is an architecture diagram of UTRAN.
Figure 2:
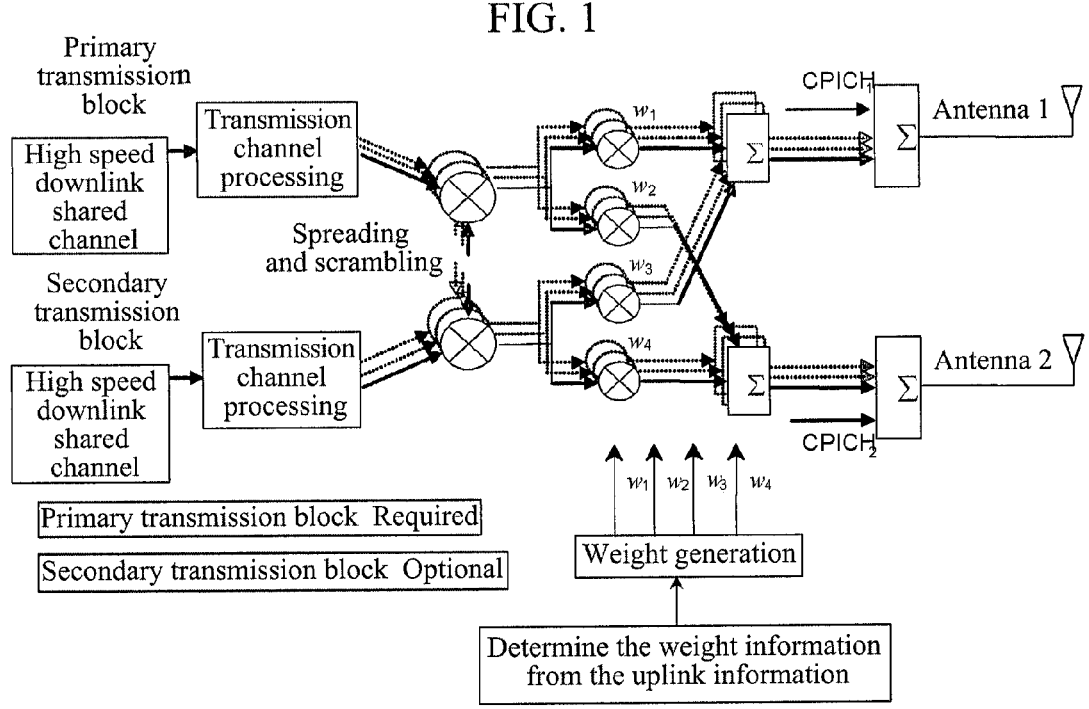
FIG. 2 is a technical principle diagram of MIMO.

The method for power saving of NodeB provided by the present invention is used in the wireless system supporting the multi-input multi-output (MIMO). When a first condition is met, the NodeB enters a power saving mode, and when a second condition is met, the NodeB recovers to a normal mode.

In the above method, when the NodeB enters the power saving mode, at least one MIMO cell of the NodeB is reconfigured as a non-MIMO cell.

In the above method, when the NodeB recovers to the normal mode, at least one non-MIMO cell of the NodeB is reconfigured as a MIMO cell.

Wherein, the first condition includes the user data amount of the MIMO cell being less than a preset user data amount threshold of reconfiguring the MIMO cell to the non-MIMO cell in a continuous period of time; and/or a time point, which is preset by a UTRAN system, of reconfiguring the MIMO cell to the non-MIMO cell. The first condition also can be defined according to requirement, and it will not be limited in the present invention.

The second condition includes the user data amount of the non-MIMO cell being greater than a preset user data amount threshold of recovering the non-MIMO cell to the MIMO cell in a continuous period of time, and/or a time point, which is preset by the UTRAN system, of recovering the non-MIMO cell to the MIMO cell. The second condition also can be defined according to requirement, and it will not be limited in the present invention.

It can be monitored by a NodeB and/or a NodeB controller or other network equipment whether the first condition or the second condition is met.

In the above method, the NodeB entering the power saving mode is finished by the NodeB actively initiating a request to the NodeB controller; or, the NodeB entering the power saving mode is finished by the active confirmation of the NodeB controller. That is, when the first condition is met, the NodeB sends a message to the NodeB controller to instruct the NodeB controller to reconfigure the MIMO cell as the non-MIMO cell, or the NodeB controller actively reconfigures the MIMO cell as the non-MIMO cell.

In the above method, the NodeB entering the normal mode is finished by the NodeB actively initiating a request to the NodeB controller; or, the NodeB entering the normal mode is finished by the active confirmation of the NodeB controller. That is, when the second condition is met, the NodeB actively sends a message to the NodeB controller to instruct the NodeB controller to reconfigure the non-MIMO cell as the MIMO cell, or the NodeB controller actively reconfigures the non-MIMO cell as the MIMO cell.

In the above method, before the MIMO cell is reconfigured to the non-MIMO cell, in order to synchronize the NodeB with the user equipment (UE), the NodeB controller can notify the UE that the MIMO cell will be reconfigured as the non-MIMO cell in a connection frame number (CFN) through a system information block (SIB) message with the CFN; at the same time, it also can notify the UE that the MIMO cell will be reconfigured as the non-MIMO cell in the CFN through a reconfiguration message with the CFN.

In the above method, before the non-MIMO cell is recovered to the MIMO cell, in order to synchronize the NodeB with the UE, the NodeB controller can notify the UE that the non-MIMO cell will be reconfigured as the MIMO cell in the CFN through a SIB message with the CFN; at the same time, it also can notify the UE that the non-MIMO cell will be reconfigured as the MIMO cell in the CFN through a reconfiguration message with the CFN.

In the above method, after the NodeB receives the reconfiguration message with the CFN sent by a radio network controller (RNC), the reconfiguration message requests the NodeB to reconfigure the MIMO cell to the non-MIMO cell, and in the designated CFN, it will reconfigure the designated cell as the non-MIMO cell and close one emitting antenna. And at the same time, a cell reconfiguration success message is returned to the RNC, and it enters the power saving mode.

In the above method, after the NodeB receives the reconfiguration message with the CFN sent by the RNC, the reconfiguration message requests the NodeB to reconfigure the non-MIMO cell to the MIMO cell, and in the designated CFN, it will reconfigure the designated cell as the MIMO cell and open one closed emitting antenna. And at the same time, the cell reconfiguration success message is returned to the RNC, and it enters the normal mode.

The implementation of the present invention is further illustrated in detail with reference to the accompanying drawings hereinafter.

Figure 3:
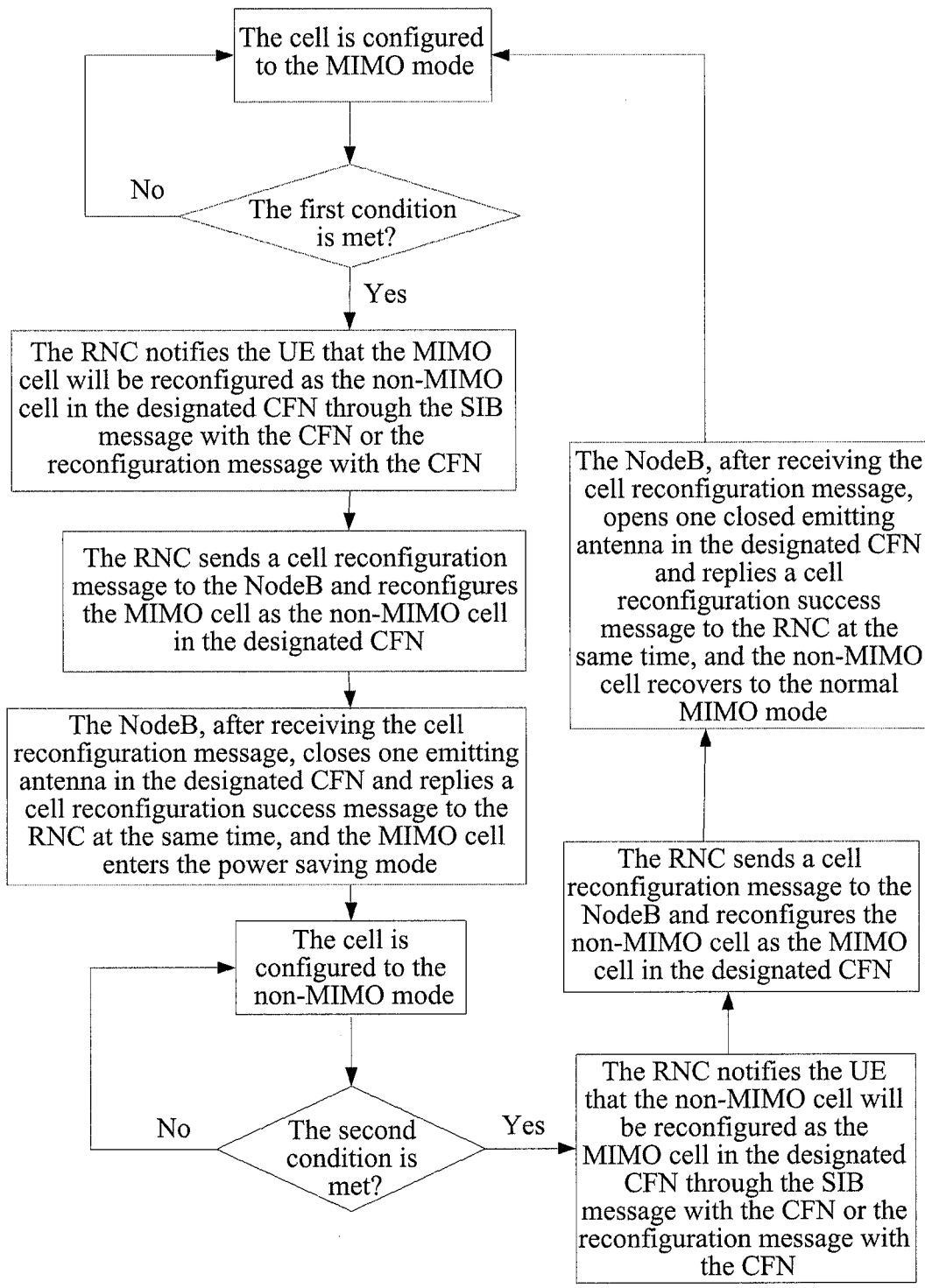
FIG. 3 is a flow chart for implementation according to the present invention.

As shown in FIG. 3, as for the cell configured as the MIMO mode, the implementation flow of the present invention includes the following steps:

in step 301, the UTRAN system presets a time point of reconfiguring the MIMO cell to the non-MIMO cell and a user data amount threshold of reconfiguring the MIMO cell to the non-MIMO cell; if the reconfiguration time point is reached or the user data amount of the MIMO cell is less than the preset threshold in a continuous period of time (here, the period of time can be set according to the practical condition of the operator), in order to save the power consumption of the NodeB, the NodeB will actively send a message to the RNC to instruct the RNC to prepare to reconfigure the cell to the non-MIMO mode, or the RNC actively prepares to reconfigure the cell to the non-MIMO mode;

in step 302, before the RNC reconfigures the MIMO cell to the non-MIMO cell, in order to synchronize the NodeB with the UE, the RNC can firstly notify the UE that the MIMO cell will be reconfigured as the non-MIMO cell in the designated CFN through the SIB message with the CFN; the RNC can also notify the UE that the MIMO cell will be reconfigured as the non-MIMO cell in the designated CFN through a reconfiguration message or other messages. At the same time, the RNC sends a cell reconfiguration message (or other messages or new defined messages, which will not be limited in the present invention) to the NodeB, to notify the NodeB to reconfigure the MIMO cell as the non-MIMO cell in the designated CFN.

In step 303, the NodeB, after receiving the cell reconfiguration message, closes one emitting antenna in the designated CFN and replies a cell reconfiguration success response to the RNC at the same time, and after this, the original MIMO cell becomes the non-MIMO cell and it enters the power saving mode.

After the cell is configured as the non-MIMO mode, the UTRAN system will recover to the MIMO mode automatically according to the preset second condition, and the specific flow is as follows.

In step 304, the UTRAN system presets a time point of recovering the non-MIMO cell to the MIMO cell and a user data amount threshold of recovering the non-MIMO cell to the MIMO cell. If the recovering time point is reached or the user data amount of the non-MIMO cell is greater than the preset threshold in a continuous period of time (here, the period of time can be set according to the practical condition of the operator), in order to satisfy the experience of MIMO user, the NodeB will actively send a message to the RNC to instruct the RNC to prepare to reconfigure the cell to the MIMO mode, or the RNC actively prepares to reconfigure the cell to the MIMO mode.

In step 305, before the RNC reconfigures the non-MIMO cell to the MIMO cell, in order to synchronize the NodeB with the UE, the RNC can firstly notify the UE that the non-MIMO cell will be reconfigured as the MIMO cell in the designated CFN through the SIB message with the CFN; the RNC can also notify the UE that the non-MIMO cell will be reconfigured as the MIMO cell in the designated CFN through a reconfiguration message. At the same time, the RNC sends a cell reconfiguration message to the NodeB, to notify the NodeB to reconfigure the non-MIMO cell as the MIMO cell in the designated CFN.

In step 306, the NodeB, after receiving the cell reconfiguration message, recovers one closed emitting antenna in the designated CFN and replies a cell reconfiguration success response to the RNC at the same time, and after this, the original MIMO cell mode is recovered and the normal mode is entered.

The system for power saving of a NodeB of the present invention includes:

a NodeB, configured to when a first condition is met, enter a power saving mode and reconfigure at least one multi-input multi-output (MIMO) cell of the NodeB as a non-MIMO cell; and when a second condition is met, enter a normal mode and reconfigure at least one non-MIMO cell of the NodeB as a MIMO cell.

The first condition comprises: user data amount of the MIMO cell being less than a preset user data amount threshold of reconfiguring the MIMO cell to the non-MIMO cell in a continuous period of time, and/or a time point, which is preset by a system, of reconfiguring the MIMO cell to the non-MIMO cell.

The second condition comprises: the user data amount of the non-MIMO cell being greater than a preset user data amount threshold of recovering the non-MIMO cell to the MIMO cell in a continuous period of time, and/or a time point, which is preset by the system, of recovering the non-MIMO cell to the MIMO cell.

The system further includes a NodeB controller, configured to send a reconfiguration message with a connection frame number (CFN) to the NodeB, and request the NodeB to reconfigure the MIMO cell to the non-MIMO cell;

the NodeB is further configured to, after receiving the reconfiguration message, reconfigure the designated cell as the non-MIMO cell and close one emitting antenna in the designated CFN.

The NodeB controller is further configured to: before the MIMO cell is reconfigured to the non-MIMO cell, notify the UE that the MIMO cell will be reconfigured as the non-MIMO cell in the CFN through a system information block (SIB) message with the CFN or a reconfiguration message with the CFN.

The system further includes a NodeB controller, configured to send the reconfiguration message with the CFN to the NodeB and instruct the NodeB to reconfigure the non-MIMO cell to the MIMO cell;

the NodeB is further configured to, after receiving the reconfiguration message, reconfigure the designated cell as the MIMO cell and open one closed emitting antenna in the designated CFN.

The NodeB controller is further configured to: before the non-MIMO cell is reconfigured to the MIMO cell, notify the UE that the non-MIMO cell will be reconfigured as the MIMO cell in the CFN through a SIB message with the CFN or a reconfiguration message with the CFN.

A system for power saving of NodeB includes a NodeB controller, which is configured to:

when a first condition is met, receive an indication message sent by the NodeB and reconfigure a multi-input multi-output (MIMO) cell as a non-MIMO cell; and when a second condition is met, receive the indication message sent by the NodeB and reconfigure a non-MIMO cell as a MIMO cell; or when the first condition is met, actively reconfigure the MIMO cell as the non-MIMO cell; or when the second condition is met, actively reconfigure the non-MIMO cell as the MIMO cell.

The NodeB controller is the RNC.

The present invention is applicable to the UMTS system or other MIMO systems, which will not be limited in the present invention.

Although for the exemplary purpose, the preferable embodiment of the present invention has already been disclosed, those skilled in the art will realize that various kinds of improvements, additions and replacement are possible, therefore, the above embodiment is not intended to limit the scope of the present invention.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limit to any specific form of the combination of the hardware and software.

INDUSTRIAL APPLICABILITY

The method and system for power saving of the NodeB provided by the article can dynamically configure the cell mode, which ensures the experience of MIMO terminal and saves the power consumption of the NodeB in the case that the user data amount is not large.

What is claimed is:

1. A method for power saving of NodeB, comprising:
   when a first condition is met, the NodeB entering a power saving mode, and at least one multi-input multi-output (MIMO) cell of the NodeB being reconfigured as a non-MIMO cell;
   when a second condition is met, the NodeB entering a normal mode, and at least one non-MIMO cell of the NodeB being reconfigured as a MIMO cell;
   the method further comprising: before the MIMO cell is reconfigured to the non-MIMO cell, a NodeB controller notifying user equipment (UE) that the MIMO cell will be reconfigured as the non-MIMO cell in CFN through a system information block (SIB) message with the CFN, the reconfiguration message with the CFN or a customized message with the CFN.

2. The method according to claim 1, wherein the first condition comprises: user data amount of the MIMO cell being less than a preset user data amount threshold of reconfiguring the MIMO cell to the non-MIMO cell in a continuous period of time, and/or a time point, preset by a system, of reconfiguring the MIMO cell to the non-MIMO cell.

3. The method according to claim 1, wherein the second condition comprises: the user data amount of the non-MIMO cell being greater than a preset user data amount threshold of recovering the non-MIMO cell to the MIMO cell in a continuous period of time, and/or a time point, preset by a system, of recovering the non-MIMO cell to the MIMO cell.

4. The method according to claim 1, wherein the step of at least one MIMO cell of the NodeB being reconfigured as the non-MIMO cell comprises:
   a NodeB controller sending a reconfiguration message with connection frame number (CFN) to the NodeB, and requesting the NodeB to reconfigure the MIMO cell to the non-MIMO cell;
   after the NodeB receives the reconfiguration message, reconfiguring a designated cell as the non-MIMO cell and closing one emitting antenna in a designated CFN.

5. The method according to claim 1, wherein the step of at least one non-MIMO cell of the NodeB being reconfigured as the MIMO cell comprises:
   a NodeB controller sending a reconfiguration message with CFN to the NodeB, and requesting the NodeB to reconfigure the non-MIMO cell to the MIMO cell;
   after the NodeB receives the reconfiguration message, reconfiguring a designated cell as the MIMO cell and opening one closed emitting antenna in a designated CFN.

6. The method according to claim 5, further comprising: before the non-MIMO cell is reconfigured to the MIMO cell, the NodeB controller notifying UE that the non-MIMO cell will be reconfigured as the MIMO cell in the CFN through a SIB message with the CFN or the reconfiguration message with the CFN or a customized message with the CFN.

7. The method according to claim 1, further comprising: before the non-MIMO cell is reconfigured to the MIMO cell, a NodeB controller notifying UE that the non-MIMO cell will be reconfigured as the MIMO cell in CFN through a SIB message with the CFN or the reconfiguration message with the CFN or a customized message with the CFN.

8. The method according to claim 1, wherein,
   the step of at least one MIMO cell of the NodeB being reconfigured as the non-MIMO cell comprises: the NodeB actively sending a message to NodeB controller to instruct the NodeB controller to reconfigure the MIMO cell as the non-MIMO cell, or the NodeB controller actively reconfiguring the MIMO cell as the non-MIMO cell;
   the step of at least one non-MIMO cell of the NodeB being reconfigured as the MIMO cell comprises: the NodeB actively sending a message to the NodeB controller to instruct the NodeB controller to reconfigure the non-MIMO cell as the MIMO cell, or the NodeB controller actively reconfiguring the non-MIMO cell as the MIMO cell.

9. A system for power saving of NodeB, comprising:
   a NodeB, configured to enter a power saving mode when a first condition is met and reconfigure at least one multi-input multi-output (MIMO) cell of the NodeB as a non-MIMO cell; and to enter a normal mode when a second condition is met and reconfigure at least one non-MIMO cell of the NodeB as a MIMO cell;
   the system further comprising a NodeB controller, configured to send a reconfiguration message with connection frame number (CFN) to the NodeB, and request the NodeB to reconfigure the MIMO cell to the non-MIMO cell;
   the NodeB being configured to reconfigure at least one MIMO cell of the NodeB as the non-MIMO cell in a following mode: after receiving the reconfiguration message, reconfiguring a designated cell as the non-MIMO cell and closing one emitting antenna in a designated CFN;
   wherein the NodeB controller is further configured to: before the MIMO cell is reconfigured to the non-MIMO cell, notify user equipment (UE) that the MIMO cell will be reconfigured as the non-MIMO cell in the CFN through a system information block (SIB) message with the CFN or the reconfiguration message with the CFN.

10. The system according to claim 9, wherein the first condition comprises: user data amount of the MIMO cell being less than a preset user data amount threshold of reconfiguring the MIMO cell to the non-MIMO cell in a continuous period of time, and/or a time point, preset by a system, of reconfiguring the MIMO cell to the non-MIMO cell.

11. The system according to claim 9, wherein the second condition comprises: the user data amount of the non-MIMO cell being greater than a preset user data amount threshold of recovering the non-MIMO cell to the MIMO cell in a continuous period of time, and/or a time point, preset by a system, of recovering the non-MIMO cell to the MIMO cell.

12. The system according to claim 9, wherein the system further comprises a NodeB controller, which is configured to send a reconfiguration message with CFN to the NodeB, and instruct the NodeB to reconfigure the non-MIMO cell to the MIMO cell;
   the NodeB is configured to reconfigure at least one non-MIMO cell of the NodeB as the MIMO cell in a following mode: after receiving the reconfiguration message, reconfiguring a designated cell as the MIMO cell and opening one closed emitting antenna in a designated CFN.

13. The system according to claim 12, wherein the NodeB controller is further configured to: before the non-MIMO cell is reconfigured to the MIMO cell, notify UE that the non-MIMO cell will be reconfigured as the MIMO cell in the CFN through a SIB message with the CFN or the reconfiguration message with the CFN.

14. A system for power saving of NodeB, comprising a NodeB controller, which is configured to:

when a first condition is met, receive an indication message sent by the NodeB and reconfigure a multi-input multi-output (MIMO) cell as a non-MIMO cell; and when a second condition is met, receive the indication message sent by the NodeB and reconfigure the non-MIMO cell as the MIMO cell; or when the first condition is met, actively reconfigure the MIMO cell as the non-MIMO cell; or when the second condition is met, actively reconfigure the non-MIMO cell as the MIMO cell;

wherein the NodeB controller is further configured to: before the MIMO cell is reconfigured to the non-MIMO cell, notify user equipment (UE) that the MIMO cell will be reconfigured as the non-MIMO cell in the CFN through a system information block (SIB) message with the CFN or the reconfiguration message with the CFN.

* * * * *